(12) United States Patent
Thomsen (10) Patent No.: US 10,065,059 B2
(45) Date of Patent: Sep. 4, 2018

(54) AUTONOMOUS FIREFIGHTING TOWER

(71) Applicant: Garry Dale Thomsen, Mesa, AZ (US)

(72) Inventor: Garry Dale Thomsen, Mesa, AZ (US)

(*) Notice: Subject to any disclaimer, the term of this patent is extended or adjusted under 35 U.S.C. 154(b) by 98 days.

(21) Appl. No.: 15/219,069

(22) Filed: Jul. 25, 2016

(65) Prior Publication Data

US 2017/0113079 A1   Apr. 27, 2017

Related U.S. Application Data

(60) Provisional application No. 62/245,364, filed on Oct. 23, 2015.

(51) Int. Cl.
| | |
|---|---|
| *A62C 31/28* | (2006.01) |
| *B05B 12/12* | (2006.01) |
| *F16M 11/34* | (2006.01) |
| *F16M 11/18* | (2006.01) |
| *F16M 11/28* | (2006.01) |
| *F16M 11/00* | (2006.01) |
| *F16M 13/00* | (2006.01) |
| *A62C 3/02* | (2006.01) |

(52) U.S. Cl.
CPC .......... *A62C 3/0292* (2013.01); *A62C 3/0271* (2013.01); *A62C 31/28* (2013.01); *B05B 12/12* (2013.01); *F16M 11/00* (2013.01); *F16M 11/18* (2013.01); *F16M 11/28* (2013.01); *F16M 11/34* (2013.01); *F16M 13/00* (2013.01)

(58) Field of Classification Search
CPC ..... A62C 3/0292; A62C 3/0271; A62C 31/28; B05B 12/12; F16M 11/00; F16M 11/34; F16M 11/18; F16M 11/28; F16M 13/00

USPC ........ 169/51, 25, 46, 67, 52, 70, 68; 33/286, 33/291; 239/273, 275, 279, 285, 71, 73; 248/169, 168, 550, 460, 435

See application file for complete search history.

(56) References Cited

U.S. PATENT DOCUMENTS

| | | | | |
|---|---|---|---|---|
| 3,030,889 | A  * | 4/1962 | Parker ....................... | B66F 3/24 |
| | | | | 254/93 R |
| 9,163,774 | B2 * | 10/2015 | Orlov ........................ | F16M 7/00 |
| 2013/0062080 | A1 * | 3/2013 | Tobin ...................... | A62C 31/28 |
| | | | | 169/46 |
| 2015/0021054 | A1 * | 1/2015 | McNamara ............. | G05D 16/20 |
| | | | | 169/46 |
| 2015/0231430 | A1 * | 8/2015 | Cook ..................... | A62C 27/00 |
| | | | | 169/24 |

* cited by examiner

*Primary Examiner* — Christopher Kim
*Assistant Examiner* — Joseph A Greenlund (57) ABSTRACT

An autonomous firefighting tower is a structure that is deployed into a firefighting zone for extinguishing a fire as well as for protecting firefighting personnel on the ground. The structure is able to self-level when being deployed on uneven terrain and requires minimal setup aside from connection to an external water source. A plurality of tower supports is hingedly connected to a base platform and may be adjusted to the terrain. Additional adjustability is provided through a plurality of self-leveling legs. A plurality of stabilizing members provides structural support and stability to the structure during self-leveling and when deployed. A fluid dispenser is connected to the base platform. Water is provided to the fluid dispenser from an external source through a fluid conduit. A control unit and at least one camera allow a remote operator to operate the structure during a firefighting operation.

9 Claims, 8 Drawing Sheets

SECTION A-A

AUTONOMOUS FIREFIGHTING TOWER

The current application claims a priority to the U.S. Provisional Patent application Ser. No. 62/245,364 filed on Oct. 23, 2015.

FIELD OF THE INVENTION

The present invention relates generally to a deployable tower. More specifically, the present invention is an autonomous firefighting tower that is utilized in frontline fire protection. The present invention is capable of extinguishing fire as well as establishing a protective zone for firefighting personnel in the vicinity of a fire.

BACKGROUND OF THE INVENTION

While firefighting in itself is a hazardous occupation, one of the riskiest forms of firefighting is frontline fire protection. This is due to the fact that firefighting personnel are directly exposed to a large wildfire that is capable of unexpected spreading, movement, and other shifts in behavior due to variables such as wind and terrain. This can result in firefighting personnel being put in danger due to the unpredictability of wildfire behavior. The unpredictable conditions presented by the intense heat and smoke of a wildfire may result in firefighting personnel becoming disoriented and prone to becoming trapped. In a worst case scenario, firefighting personnel may become trapped in a hazardous area with no possibility of rescue. Frontline firefighting often requires massive amounts of resources in the form of personnel, aircraft, and chemicals used to suppress the wildfires. A wildfire that cannot be contained may result in extensive property loss as well as deaths among firefighting personnel and the general population.

The present invention is an autonomous firefighting tower that may be rapidly deployed in the vicinity of a fire. The present invention is capable of both extinguishing a fire as well as establishing a protective zone for firefighting personnel who may otherwise become trapped by a fire. When in use, the present invention only requires a connection to a natural or artificial water source and may function autonomously without any further personnel input. Because the present invention requires a bare minimum of personnel input for operation, firefighting resources may be allocated to higher priority tasks. Additionally, the present invention minimizes the need for firefighting personnel to risk their lives in a hazardous area while combating a fire. Finally, the present invention facilitates reaching and combating a fire located in a remote location that is normally unreachable or difficult to reach for firefighting personnel.

DETAIL DESCRIPTIONS OF THE INVENTION

All illustrations of the drawings are for the purpose of describing selected versions of the present invention and are not intended to limit the scope of the present invention.

Figure 1:
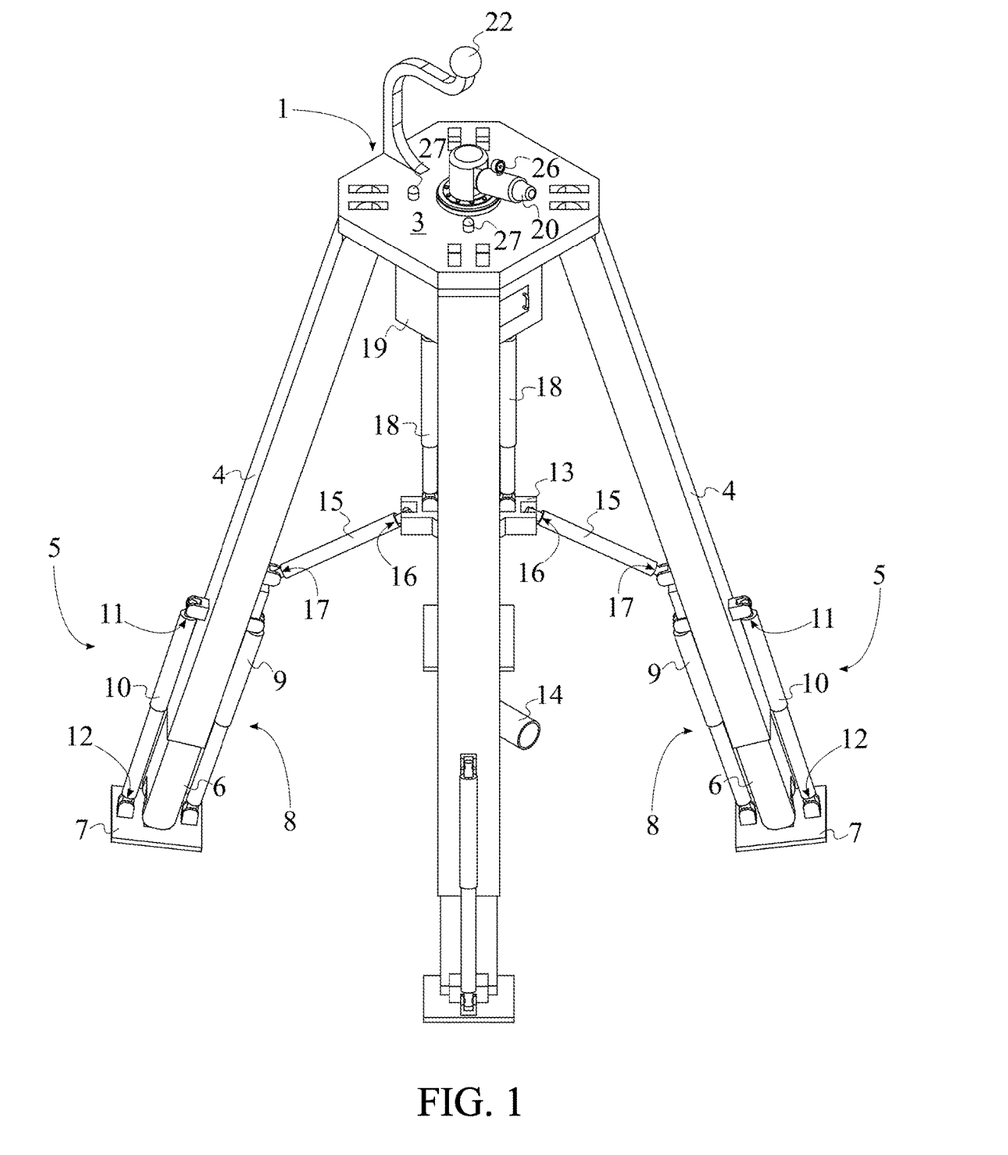
FIG. 1 is a top perspective view of the present invention.
Figure 2:
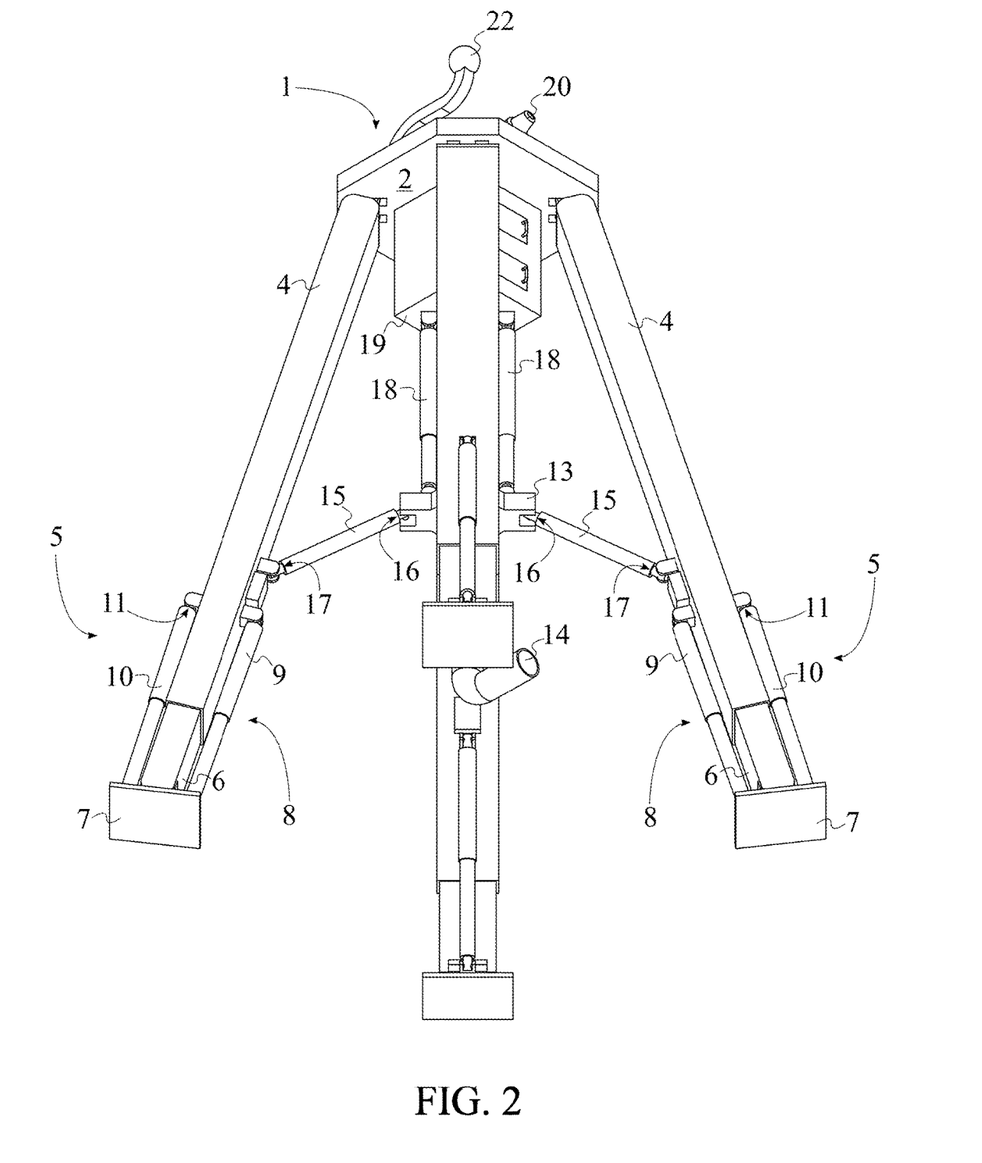
FIG. 2 is a bottom perspective view of the present invention.
Figure 3:
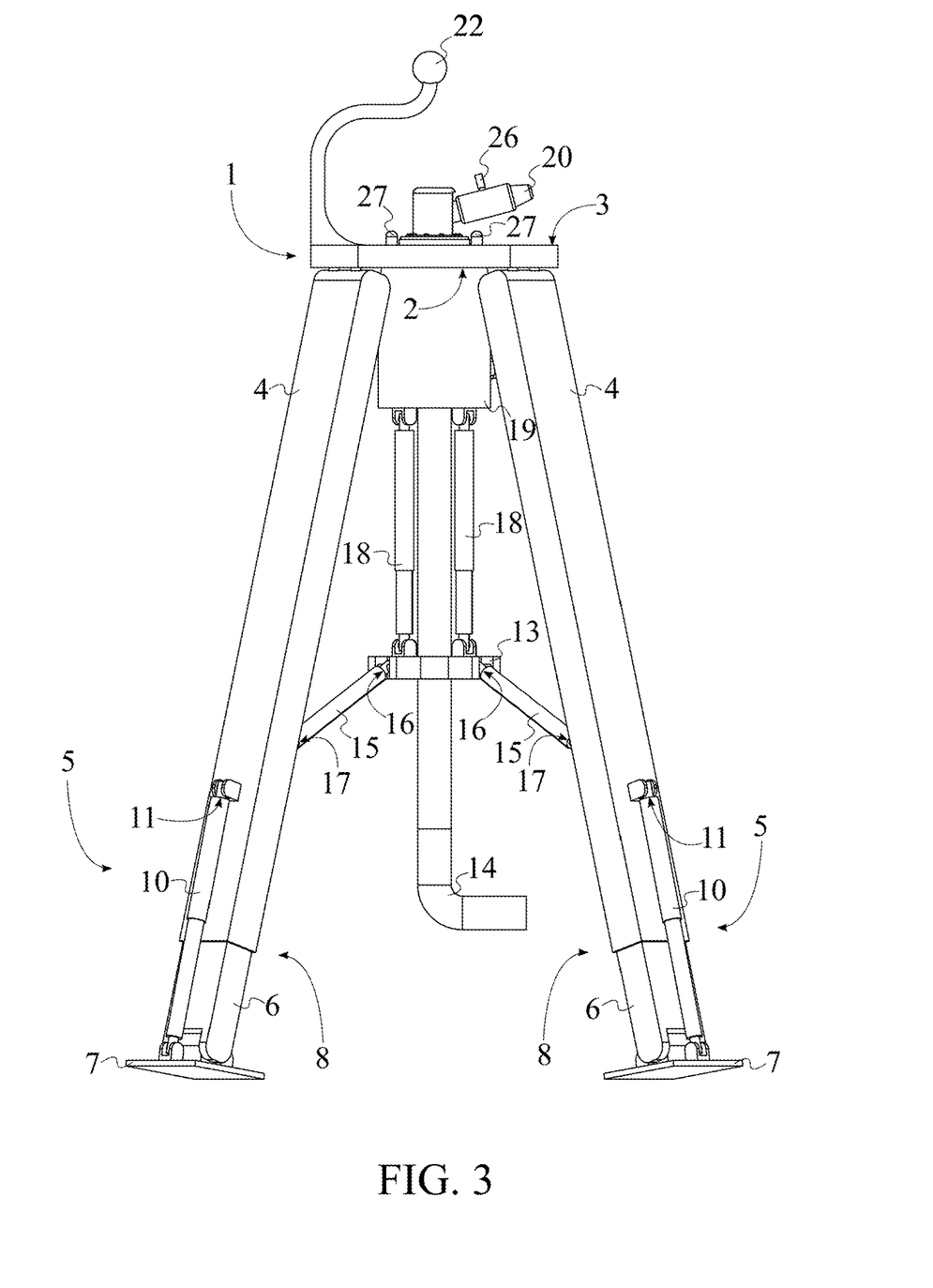
FIG. 3 is a front view of the present invention.
Figure 4:
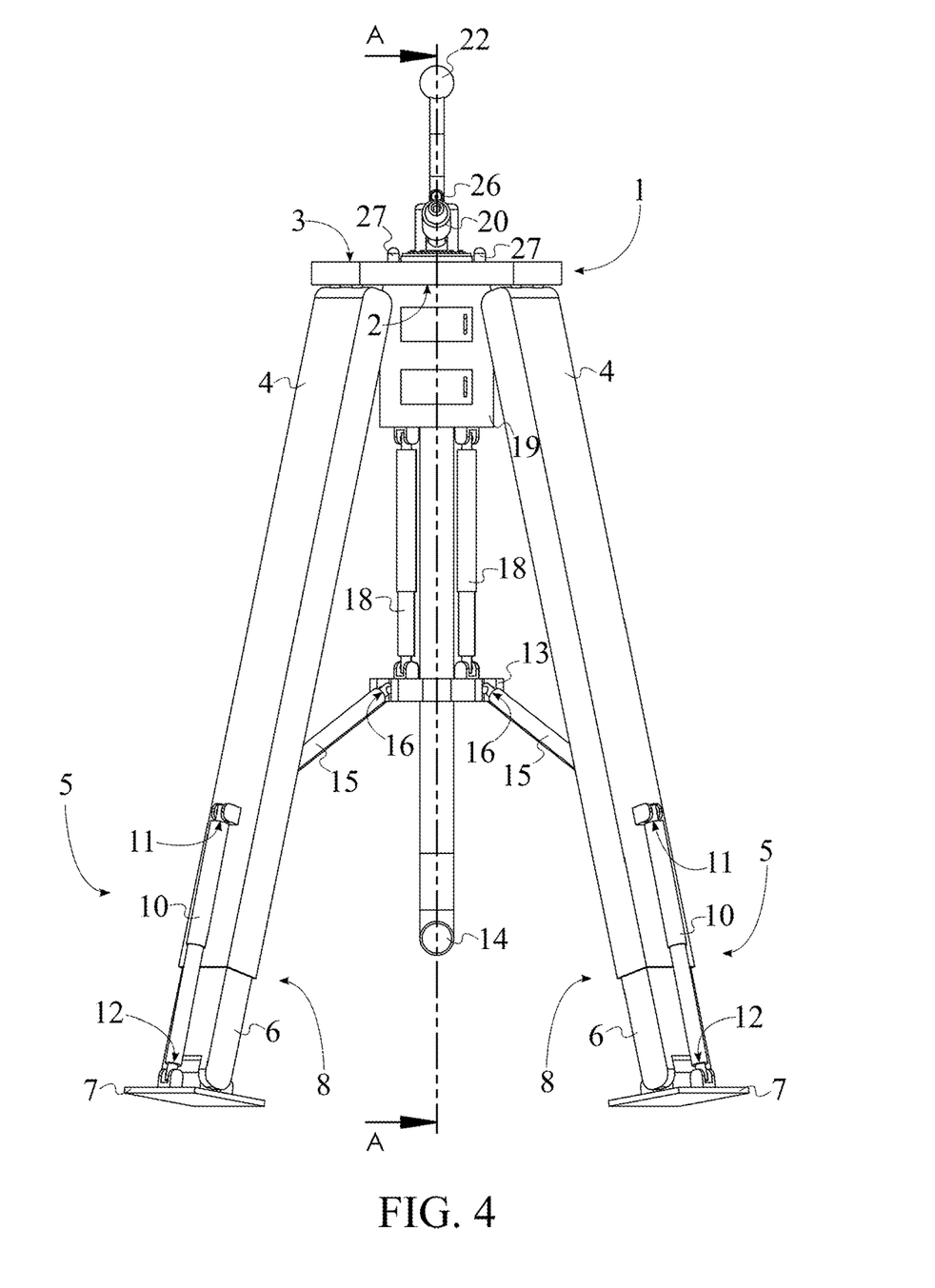
FIG. 4 is a side view of the present invention.
Figure 5:
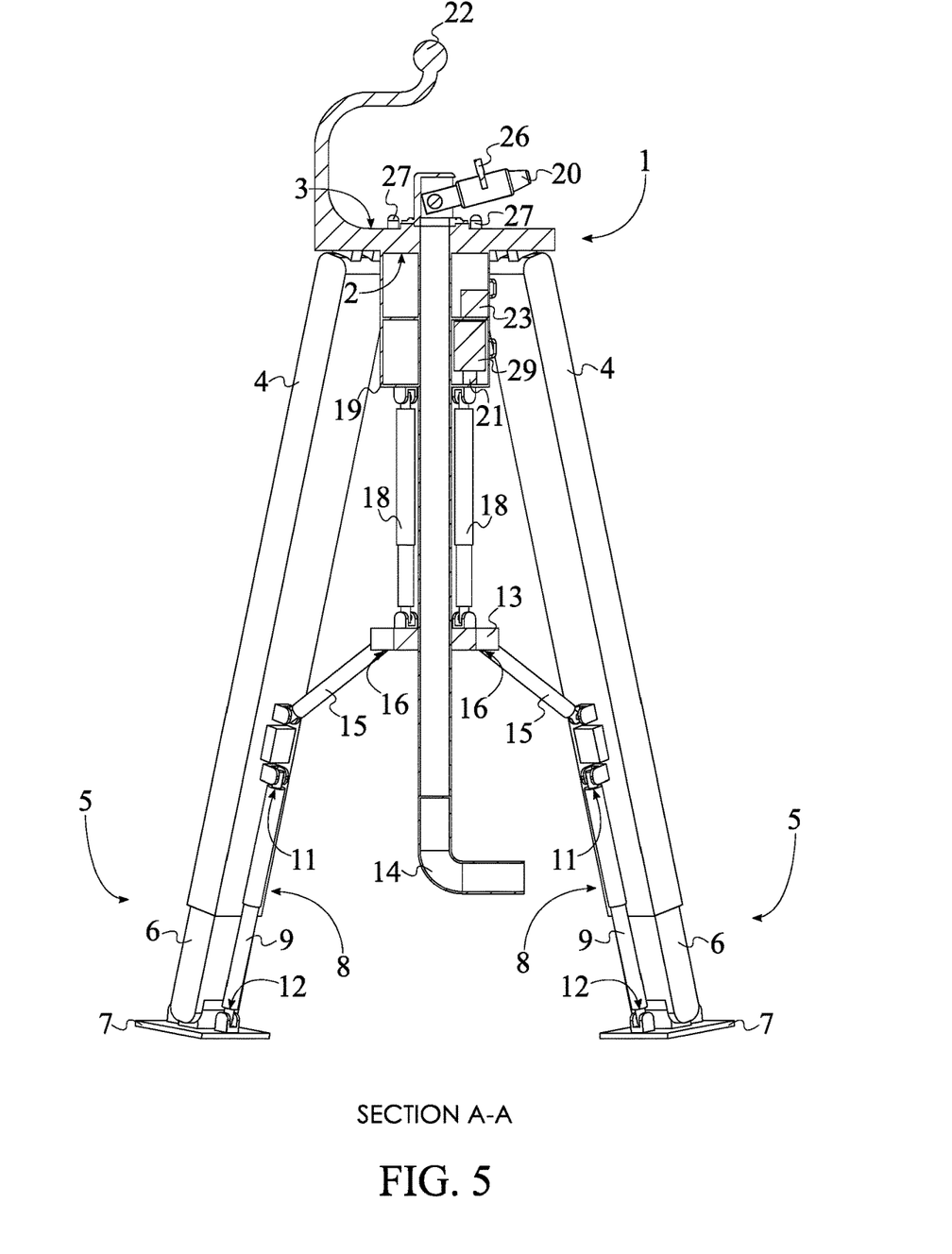
FIG. 5 is a cross-sectional view of the present invention taken along line A-A of FIG. 4.
Figure 6:
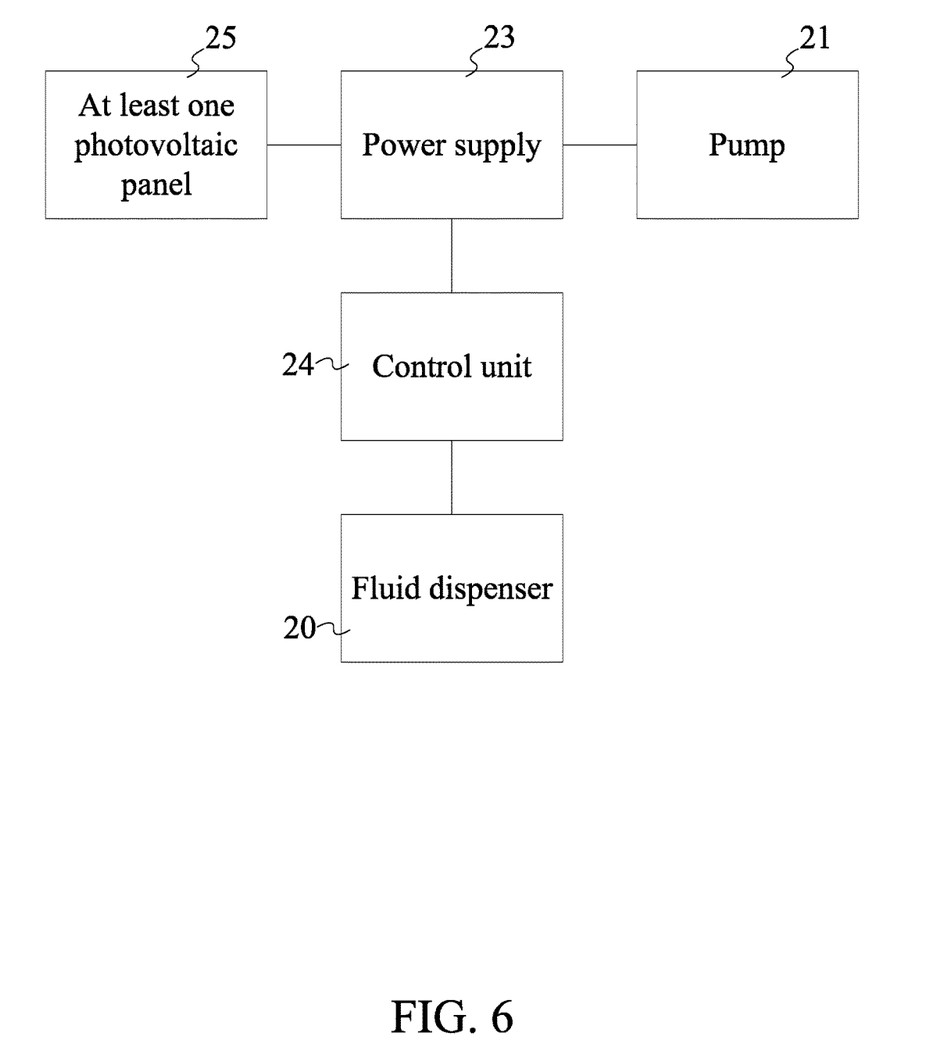
FIG. 6 is a diagram of electronic and electrical connections of the present invention.
Figure 7:
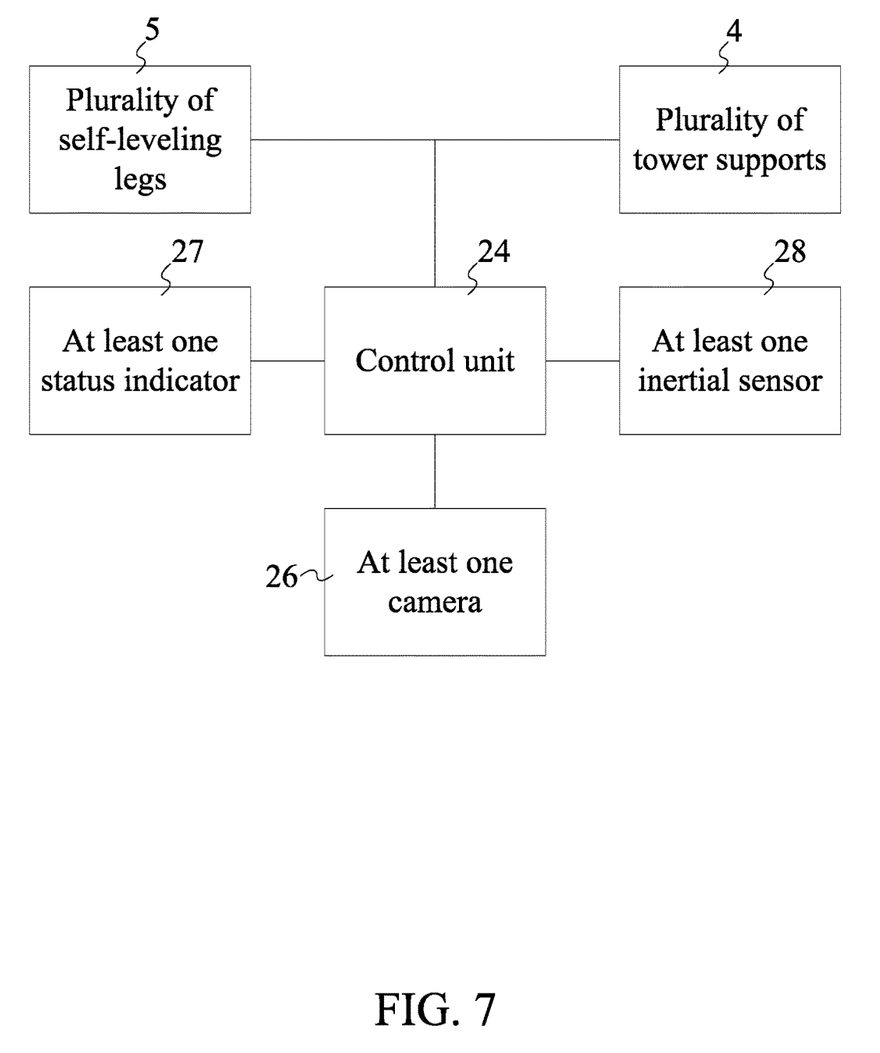
FIG. 7 is a diagram of additional electronic and electrical connections of the present invention.
Figure 8:
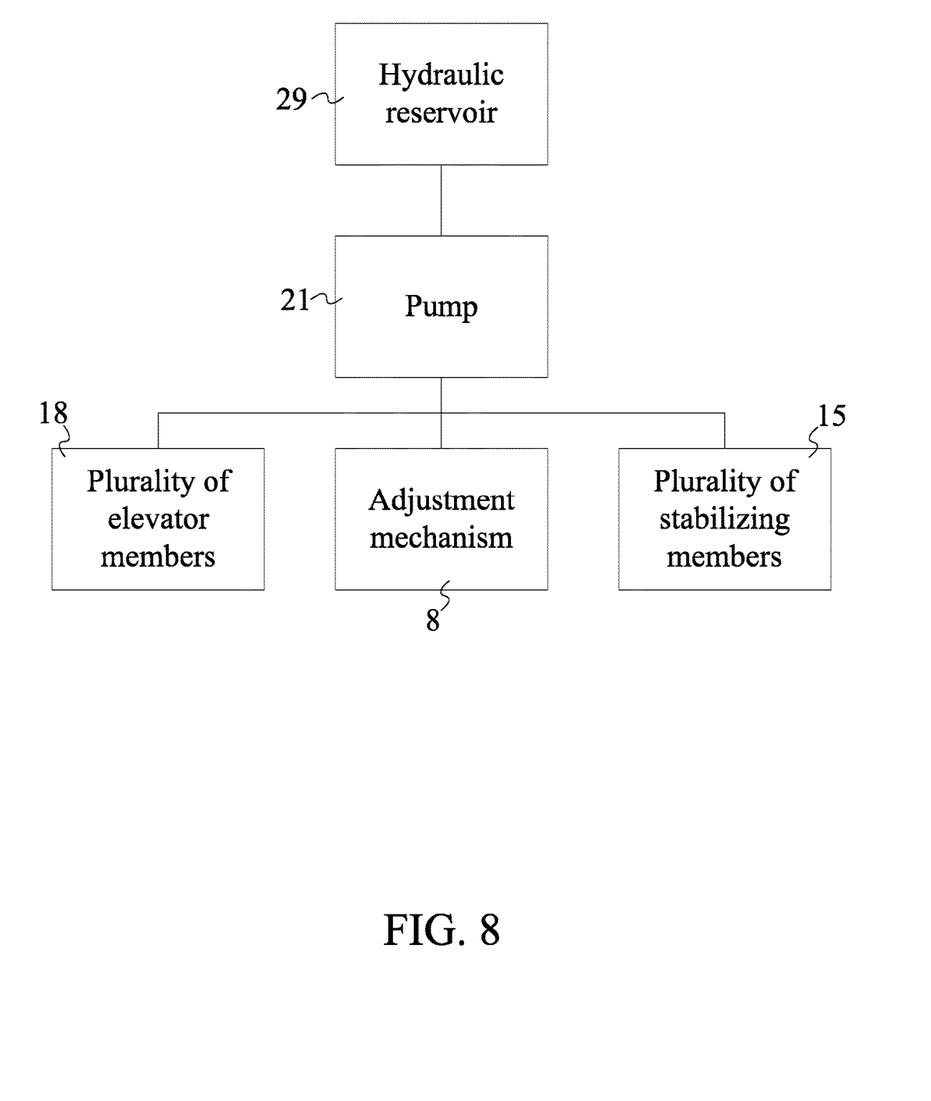
FIG. 8 is a diagram of connections of the hydraulic reservoir.

The present invention is an autonomous firefighting tower that may be deployed in the vicinity of a fire. The present invention is shown in FIGS. 1-5 and comprises a base platform 1, a plurality of tower supports 4, a plurality of self-leveling legs 5, a support hub 13, and a fluid conduit 14. Electronic and electrical components and connections of the present invention are shown in FIG. 6 and FIG. 7. The present invention is able to adjust and adapt to the terrain of a deployment zone as needed and requires minimal personnel investment for deployment, minimizing the need to place firefighting personnel into potential hazardous conditions.

The base platform 1 serves as an upper portion of the present invention and as a foundation onto which additional components of the present invention are mounted. The plurality of tower supports 4 is utilized to elevate the base platform 1 above the terrain on which the present invention is deployed and is able to adjust to the terrain if the terrain is uneven. As a result, the base platform 1 and the plurality of tower supports 4 form a tower-like structure. The plurality of tower supports 4 is evenly distributed about the base platform 1 in order to allow the plurality of tower supports 4 to properly elevate and support the base platform 1 above the terrain when the present invention is deployed. The plurality of tower supports 4 is hingedly connected to the base platform 1 as well, allowing the orientation of each of the plurality of tower supports 4 to be adjusted individually based on the terrain.

The plurality of self-leveling legs 5 enables further adjustability of the present invention when deployed. Each of the plurality of self-leveling legs 5 comprises an elongated member 6, a foot 7, and an adjustment mechanism 8. The elongated member 6 is able to extend and retract from the plurality of tower supports 4 when the present invention is being leveled on the terrain. The foot 7 provides a foundation for each of the plurality of self-leveling legs 5 on the terrain when deployed and may be adjusted relative to the elongated member 6. The adjustment mechanism 8 is a mechanical and/or electronic mechanism that is utilized to self-level the plurality of self-leveling legs 5 when the present invention is being deployed on uneven terrain. Each of the plurality of self-leveling legs 5 is slidably engaged into a corresponding support from the plurality of tower supports 4. Each of the plurality of self-leveling legs 5 is able to individually slide into and out of the corresponding support from the plurality of tower supports 4 as needed, enabling the present invention to be leveled on uneven terrain. The foot 7 is hingedly mounted to the corresponding support from the plurality of tower supports 4 by the adjustment mechanism 8. The adjustment mechanism 8 is utilized to hingedly adjust the foot 7 to accommodate uneven terrain when the foot 7 is placed into contact with the terrain during deployment of the present invention.

The fluid conduit 14 may be connected to an external water source and is utilized to deliver water into the present invention for firefighting purposes. The connection of the fluid conduit 14 to the external water source is the only manual setup required for the present invention. The support hub 13 serves as a centralized guide for the fluid conduit 14 and the plurality of tower supports 4 and provides stability for the present invention during and after deployment. The fluid conduit 14 traverses centrally through the base platform 1 and the support hub 13, positioning the fluid conduit 14 in a manner such that the fluid conduit 14 does not physically interfere with the adjustability of the present invention via the plurality of tower supports 4 and the plurality of self-leveling legs 5. The support hub 13 is slidably engaged to the fluid conduit 14 while each of the plurality of tower supports 4 is hingedly connected to the support hub 13. The support hub 13 is thus able to slide along the fluid conduit 14 when the plurality of tower supports 4 is hingedly adjusted to the terrain on which the present invention is deployed.

The present invention further comprises a plurality of stabilizing members 15. The plurality of stabilizing members 15 provides additional stability for the present invention along with the support hub 13 and serves to connect the support hub 13 to the plurality of tower supports 4. The plurality of stabilizing members 15 is laterally distributed about the support hub 13 and is positioned to extend outward from the support hub 13 and connect to the plurality of tower supports 4. A first end 16 of each of the plurality of stabilizing members 15 is hingedly connected to the support hub 13 while a second end 17 of each of the plurality of stabilizing members 15 is hingedly connected to a corresponding support from the plurality of tower supports 4, adjacent to the adjustment mechanism 8.

The present invention further comprises a pump 21 and a hydraulic reservoir 29. The pump 21 is utilized to transport hydraulic fluid within the hydraulic reservoir 29 to the adjustment mechanism 8 and the plurality of stabilizing members 15. In the preferred embodiment of the present invention, the adjustment mechanism 8 comprises a first hydraulic ram 9 and a second hydraulic ram 10. The first hydraulic ram 9 and the second hydraulic ram 10 are utilized to connect the foot 7 to the corresponding support from the plurality of tower supports 4 as well as to enable the foot 7 to be hingedly adjusted on the elongated member 6. A proximal end 11 of the first hydraulic ram 9 and a proximal end 11 of the second hydraulic ram 10 are hingedly connected to the corresponding support. Similarly, a distal end 12 of the first hydraulic ram 9 and a distal end 12 of the second hydraulic ram 10 are hingedly connected to the foot 7. The foot 7 is thus able to hingedly adjust to the terrain based on the movement of the first hydraulic ram 9 and the second hydraulic ram 10. The first hydraulic ram 9 and the second hydraulic ram 10 are positioned opposite to each other on the corresponding support and the foot 7. As a result, the first hydraulic ram 9 and the second hydraulic ram 10 are able to move in opposite directions relative to each other when the foot 7 is hingedly adjusted. More specifically, contraction of the first hydraulic ram 9 results in expansion of the second hydraulic ram 10 and vice versa, generating the hinging movement of the foot 7 relative to the elongated member 6 during self-leveling. The hydraulic reservoir 29 is in fluid communication with the adjustment mechanism 8 and the plurality of stabilizing members 15 through the pump 21, enabling the pump 21 to transport hydraulic fluid from the hydraulic reservoir 29 to the adjustment mechanism 8 and the plurality of stabilizing members 15.

The present invention further comprises a plurality of elevator members 18 and an equipment enclosure 19. The plurality of elevator members 18 is utilized to raise and lower the support hub 13 based on the movement of the plurality of tower supports 4 during self-leveling of the present invention. The equipment enclosure 19 houses mechanical and electronic components required for normal operation of the present invention. Additionally, the equipment enclosure 19 may house hydraulic fluid that is required for normal operation of the present invention. The equipment enclosure 19 is centrally positioned on a lower surface 2 of the base platform 1 and is positioned in a manner such that the equipment enclosure 19 cannot physically interfere with the operation of the present invention. The plurality of elevator members 18 is hingedly connected to the equipment enclosure 19, enabling the plurality of elevator members 18 to be hingedly adjusted relative to the equipment enclosure 19 as needed during self-leveling of the present invention. The plurality of elevator members 18 is positioned around the fluid conduit 14, positioning the fluid conduit 14 within the plurality of elevator members 18 and enabling the plurality of elevator members 18 to adjust as needed around the fluid conduit 14. The support hub 13 is slidably engaged to the fluid conduit 14 by the plurality of elevator members 18. This allows the support hub 13 to slide along the fluid conduit 14 based on the movement of the plurality of tower supports 4 during self-leveling of the present invention. The hinged connection between the support hub 13 and the plurality of tower supports 4 provided by the plurality of stabilizing members 15 enables the support hub 13 to slide along the fluid conduit 14 as the plurality of tower supports 4 is adjusted. The pump 21 and the hydraulic reservoir 29 are positioned within the equipment enclosure 19 and are thus protected from the exterior environment. The hydraulic reservoir 29 is in fluid communication with the plurality of elevator members 18 through the pump 21, enabling the pump 21 to transport hydraulic fluid from the hydraulic reservoir 29 to the plurality of elevator members 18.

The present invention further comprises a fluid dispenser 20. The fluid dispenser 20 is utilized to project water over a distance during a firefighting operation. The fluid dispenser 20 is centrally and rotatably connected to an upper surface 3 of the base platform 1. This enables the fluid dispenser 20 to be rotated 360° in order to allow the present invention to cover all directions around the present invention when deployed. The fluid dispenser 20 is positioned opposite to the equipment enclosure 19 on the base platform 1. The fluid dispenser 20 may additionally be adjusted to alter the arc distance of water being dispensed from the fluid dispenser 20. The fluid dispenser 20 may be utilized to actively extinguish a fire. However, the adjustability of the fluid dispenser 20 additionally allows the fluid dispenser 20 to be utilized to create a safe zone to protect firefighting personnel from a fire. For example, this may be accomplished by dispersing water in a circular direction in order to form a ring around the present invention that serves as a safe zone.

The present invention is primarily designed for aerial deployment from an aircraft such as a helicopter. As such, the present invention further comprises a recovery fastener mount 22. The recovery fastener mount 22 is utilized to tether the present invention to a deployment/recovery line dropped from a helicopter. The present invention may then be flown to the firefighting site and deployed. The present invention may be similarly recovered utilizing the recovery fastener mount 22. The recovery fastener mount 22 is connected onto the base platform 1 and is thus positioned at the uppermost portion of the present invention, facilitating aerial deployment and retrieval of the present invention. The recovery fastener mount 22 eliminates the need for ground personnel during deployment and recovery of the present invention.

With reference to FIG. 6 and FIG. 7, the present invention further comprises a power supply 23 that provides electrical power to the electronic components of the present invention.

The power supply 23 is electrically connected to the pump 21, providing electrical power to the pump 21 and allowing the pump 21 to draw water from the external water source for dispersal through the fluid dispenser 20. The present invention further comprises a control unit 24 that enables the present invention to be wirelessly controlled by a remote operator and eliminates the need for the operator to be placed into a potentially hazardous firefighting zone. The power supply 23 is electrically connected to the control unit 24, providing electrical power to the electronic components of the control unit 24. The control unit 24 is electronically connected to the fluid dispenser 20. As a result, the remote operator is able to aim and otherwise control the fluid dispenser 20 during a firefighting operation.

Because the present invention may be deployed for extended durations of time, the power supply 23 of the present invention may be recharged in order to ensure continuous operation. The present invention further comprises at least one photovoltaic panel 25 that is utilized to charge the power supply 23 as needed. The at least one photovoltaic panel 25 eliminates the need to connect the present invention to an external power source. The power supply 23 is electrically connected to the at least one photovoltaic panel 25, allowing the at least one photovoltaic panel 25 to convert solar energy to electricity.

With continued reference to FIGS. 1-5 and FIG. 7, the present invention further comprises at least one status indicator 27 and at least one inertial sensor 28. The at least one status indicator 27 provides visual confirmation that the present invention is level or not level on the terrain during deployment. The at least one status indicator 27 is preferably a highly visible lighting device such as a light-emitting diode (LED) that is capable of displaying multiple colors (for example, green light indicating that the present invention is level and red light indicating that the present invention is not level). The at least one status indicator 27 is externally mounted to the base platform 1 and is thus easily visible (for example, by a helicopter pilot). Alternatively, the at least one status indicator 27 may be positioned on the plurality of tower supports 4. The at least one inertial sensor 28 is utilized to determine if the present invention is level by monitoring the orientation of the present invention relative to the terrain. The at least one inertial sensor 28 continuously monitors the orientation of the present invention during self-leveling via the plurality of tower supports 4 and the plurality of self-leveling legs 5. The at least one status indicator 27 and the at least one inertial sensor 28 are electronically connected to each other through the control unit 24. As a result, the at least one status indicator 27 is able to provide a visual indication of the measurement provided by the at least one inertial sensor 28 relating to the leveling of the present invention on the terrain. The control unit 24 is electronically connected to the plurality of tower supports 4 and the plurality of self-leveling legs 5 in order to allow the control unit 24 to manage the self-leveling of the present invention through the plurality of tower supports 4 and the plurality of self-leveling legs 5.

The present invention further comprises at least one camera 26. The at least one camera 26 is utilized to aid the remote operator during operation of the present invention by providing a live view of the surrounding areas of the present invention. In the preferred embodiment of the present invention, the at least one camera 26 is mounted to the fluid dispenser 20. The at least one camera 26 is thus able to rotate along with the fluid dispenser 20 during use of the present invention, providing a live view of the direction in which the fluid dispenser 20 is pointed. In alternative embodiments of the present invention, the at least one camera 26 may be able to rotate and otherwise adjust independently of the fluid dispenser 20. The at least one camera 26 is electronically connected to the control unit 24, enabling the control unit 24 to process the live view captured by the at least one camera 26 as well as to allow the at least one camera 26 to be controlled by the remote operator.

Although the present invention has been explained in relation to its preferred embodiment, it is understood that many other possible modifications and variations can be made without departing from the spirit and scope of the present invention as hereinafter claimed.

What is claimed is:

1. An autonomous firefighting tower comprises:
   a base platform;
   a plurality of tower supports;
   a plurality of self-leveling legs;
   a support hub;
   a fluid conduit;
   each of the plurality of self-leveling legs comprises an elongated member, a foot, and an adjustment mechanism;
   the plurality of tower supports being evenly distributed about the base platform;
   the plurality of tower supports being hingedly connected to the base platform;
   each of the plurality of self-leveling legs being slidably engaged into a corresponding support from the plurality of tower supports;
   the foot being hingedly mounted to the corresponding support from the plurality of tower supports by the adjustment mechanism;
   the fluid conduit traversing centrally through the base platform and the support hub;
   the support hub being slidably engaged to the fluid conduit;
   each of the plurality of tower supports being hingedly connected to the support hub;
   a plurality of stabilizing members;
   the plurality of stabilizing members being laterally distributed about the support hub;
   a first end of each of the plurality of stabilizing members being hingedly connected to the support hub;
   a second end of each of the plurality of stabilizing members being hingedly connected to a corresponding support from the plurality of tower supports, adjacent to the adjustment mechanism;
   a pump;
   a hydraulic reservoir;
   the adjustment mechanism comprises a first hydraulic ram and a second hydraulic ram;
   a proximal end of the first hydraulic ram and a proximal end of the second hydraulic ram being hingedly connected to the corresponding support;
   a distal end of the first hydraulic ram and a distal end of the second hydraulic ram being hingedly connected to the foot;
   the first hydraulic ram and the second hydraulic ram being positioned opposite to each other on the corresponding support and the foot; and
   the hydraulic reservoir being in fluid communication with the adjustment mechanism and the plurality of stabilizing members through the pump.

2. The autonomous firefighting tower as claimed in claim 1 further comprises:
   a plurality of elevator members;
   an equipment enclosure;

the equipment enclosure being centrally positioned on a lower surface of the base platform;

the plurality of elevator members being hingedly connected to the equipment enclosure;

the plurality of elevator members being positioned around the fluid conduit;

the support hub being slidably engaged to the fluid conduit by the plurality of elevator members;

the pump and the hydraulic reservoir being positioned within the equipment enclosure; and the hydraulic reservoir being in fluid communication with the plurality of elevator members through the pump.

3. The autonomous firefighting tower as claimed in claim 2 further comprises:

a power supply;

the power supply being positioned within the equipment enclosure; and the power supply being electrically connected to the pump.

4. The autonomous firefighting tower as claimed in claim 1 further comprises:

a fluid dispenser; and the fluid dispenser being centrally and rotatably connected to an upper surface of the base platform.

5. The autonomous firefighting tower as claimed in claim 1 further comprises:

a recovery fastener mount; and the recovery fastener mount being connected onto the base platform.

6. The autonomous firefighting tower as claimed in claim 4 further comprises:

a power supply;

a control unit;

the power supply being electrically connected to the control unit; and the control unit being electronically connected to the fluid dispenser.

7. The autonomous firefighting tower as claimed in claim 1 further comprises:

a power supply;

at least one photovoltaic panel; and the power supply being electrically connected to the at least one photovoltaic panel.

8. The autonomous firefighting tower as claimed in claim 1 further comprises:

a control unit;

at least one status indicator;

at least one inertial sensor;

the at least one status indicator being externally mounted to the base platform;

the at least one status indicator and the at least one inertial sensor being electronically connected to each other through the control unit; and the control unit being electronically connected to the plurality of tower supports and the plurality of self-leveling legs.

9. The autonomous firefighting tower as claimed in claim 1 further comprises:

at least one camera;

a fluid dispenser;

the fluid dispenser being centrally and rotatably connected to an upper surface of the base platform;

the at least one camera being mounted to the fluid dispenser; and the at least one camera being electronically connected to the control unit.

* * * * *